(12) United States Patent
Bosworth et al.

(10) Patent No.: US 7,827,208 B2
(45) Date of Patent: Nov. 2, 2010

(54) GENERATING A FEED OF STORIES PERSONALIZED FOR MEMBERS OF A SOCIAL NETWORK

(75) Inventors: Andrew G. Bosworth, Palo Alto, CA (US); Chris Cox, Palo Alto, CA (US); Ruchi Sanghvi, Palo Alto, CA (US); Thyagarajapuram S. Ramakrishnan, Saratoga, CA (US); Adam D'Angelo, Mountain View, CA (US)

(73) Assignee: Facebook, Inc., Palo Alto, CA (US)

( * ) Notice: Subject to any disclaimer, the term of this patent is extended or adjusted under 35 U.S.C. 154(b) by 50 days.

(21) Appl. No.: 11/502,757

(22) Filed: Aug. 11, 2006

(65) Prior Publication Data

US 2008/0040370 A1    Feb. 14, 2008

(51) Int. Cl.
*G06F 7/00* (2006.01)
(52) U.S. Cl. .................................... 707/802
(58) Field of Classification Search ............ 707/104, 707/102, 802, 999.102
See application file for complete search history.

(56) References Cited

U.S. PATENT DOCUMENTS

| | | | |
|---|---|---|---|
| 5,937,413 A | 8/1999 | Hyun | |
| 6,029,141 A | 2/2000 | Bezos | |
| 6,029,195 A | 2/2000 | Herz | |
| 6,513,069 B1 | 1/2003 | Abato et al. | |
| 6,816,850 B2 * | 11/2004 | Culliss | 707/1 |
| 7,013,292 B1 | 3/2006 | Hsu | |
| 7,249,123 B2 * | 7/2007 | Elder et al. | 707/3 |
| 7,269,590 B2 * | 9/2007 | Hull et al. | 707/10 |
| 7,496,603 B2 | 2/2009 | Deguchi et al. | |
| 2001/0037721 A1 | 11/2001 | Hasegawa | |
| 2002/0059201 A1 * | 5/2002 | Work | 707/3 |
| 2003/0145093 A1 | 7/2003 | Oren | |
| 2003/0222918 A1 | 12/2003 | Coulthard | |
| 2003/0225632 A1 | 12/2003 | Tong | |
| 2004/0024846 A1 | 2/2004 | Randall | |
| 2004/0088177 A1 | 5/2004 | Travis | |
| 2004/0148275 A1 | 7/2004 | Achlioptas | |
| 2005/0021750 A1 * | 1/2005 | Abrams | 709/225 |
| 2005/0114759 A1 | 5/2005 | Williams | |
| 2005/0154639 A1 | 7/2005 | Zetmeir | |
| 2005/0159970 A1 | 7/2005 | Buyukkokten | |
| 2005/0171799 A1 | 8/2005 | Hull | |

(Continued)

OTHER PUBLICATIONS

U.S. Appl. No. 11/639,655, Mark Zuckerberg, Systems and Methods for Social Mapping, filed Dec. 14, 2006.

(Continued)

*Primary Examiner*—John R. Cottingham
*Assistant Examiner*—Mohammed R Uddin
(74) *Attorney, Agent, or Firm*—Fenwick & West LLP (57) ABSTRACT

Systems and methods for generating dynamic relationship-based content personalized for members of a web-based social network are provided. At least one action of one or more members of a web-based social network is associated with relationship data for the one or more members to produce consolidated data. One or more elements associated with the consolidated data is identified and used to aggregate the consolidated data. Further exemplary methods comprise weighting by affinity the aggregated consolidated data to generate dynamic relationship-based content personalized for the members of the web-based social network.

19 Claims, 5 Drawing Sheets

U.S. PATENT DOCUMENTS

| | | | |
|---|---|---|---|
| 2005/0171955 | A1* | 8/2005 | Hull et al. ................. 707/10 |
| 2005/0177385 | A1* | 8/2005 | Hull et al. ................. 705/1 |
| 2005/0197846 | A1 | 9/2005 | Pezaris |
| 2005/0198020 | A1 | 9/2005 | Garland |
| 2005/0198031 | A1 | 9/2005 | Pezaris |
| 2005/0198305 | A1* | 9/2005 | Pezaris et al. ............. 709/227 |
| 2005/0203807 | A1 | 9/2005 | Bezos |
| 2005/0216300 | A1 | 9/2005 | Appelman |
| 2005/0216550 | A1 | 9/2005 | Paseman |
| 2005/0235062 | A1* | 10/2005 | Lunt et al. ................. 709/225 |
| 2005/0256756 | A1* | 11/2005 | Lam et al. ................. 705/10 |
| 2006/0026147 | A1 | 2/2006 | Cone et al. |
| 2006/0041543 | A1 | 2/2006 | Achlioptas |
| 2006/0042483 | A1* | 3/2006 | Work et al. ................. 101/91 |
| 2006/0048059 | A1* | 3/2006 | Etkin ....................... 715/745 |
| 2006/0052091 | A1 | 3/2006 | Onyon |
| 2006/0080613 | A1 | 4/2006 | Savant |
| 2006/0085419 | A1 | 4/2006 | Rosen |
| 2006/0136419 | A1 | 6/2006 | Brydon |
| 2006/0143067 | A1 | 6/2006 | Calabria |
| 2006/0143183 | A1* | 6/2006 | Goldberg et al. ............. 707/10 |
| 2006/0161599 | A1 | 7/2006 | Rosen |
| 2006/0184617 | A1 | 8/2006 | Nicholas |
| 2006/0190281 | A1 | 8/2006 | Kott |
| 2006/0194186 | A1* | 8/2006 | Nanda ....................... 434/350 |
| 2006/0218225 | A1 | 9/2006 | Hee Voon |
| 2006/0229063 | A1 | 10/2006 | Koch |
| 2006/0230061 | A1* | 10/2006 | Sample et al. .......... 707/103 R |
| 2006/0247940 | A1* | 11/2006 | Zhu et al. ................. 705/1 |
| 2006/0248573 | A1 | 11/2006 | Pannu |
| 2006/0256008 | A1 | 11/2006 | Rosenberg |
| 2006/0265227 | A1 | 11/2006 | Sadamura |
| 2006/0265277 | A1 | 11/2006 | Yasinovsky et al. |
| 2006/0293976 | A1 | 12/2006 | Nam |
| 2006/0294085 | A1* | 12/2006 | Rose et al. ................. 707/3 |
| 2007/0174389 | A1* | 7/2007 | Armstrong et al. .......... 709/204 |
| 2007/0208916 | A1 | 9/2007 | Tomita |
| 2007/0261071 | A1* | 11/2007 | Lunt et al. ................. 725/13 |
| 2007/0266097 | A1* | 11/2007 | Harik et al. ................. 709/204 |
| 2007/0282987 | A1 | 12/2007 | Fischer |
| 2008/0005076 | A1 | 1/2008 | Payne |
| 2008/0010343 | A1 | 1/2008 | Escaffi |
| 2008/0033776 | A1 | 2/2008 | Marchese |
| 2008/0040428 | A1* | 2/2008 | Wei et al. ................. 709/204 |
| 2008/0070697 | A1 | 3/2008 | Robinson |
| 2008/0086458 | A1 | 4/2008 | Robinson |
| 2009/0171950 | A1 | 7/2009 | Lunenfeld |

OTHER PUBLICATIONS

U.S. Appl. No. 11/646,206, Aaron Sittig, Systems and Methods for Generating a Social Timeline, filed Dec. 26, 2006.

U.S. Appl. No. 11/493,291, Mark Zuckerberg, Systems and Methods for Dynamically Generating a Privacy Summary, filed Jul. 25, 2006.

U.S. Appl. No. 11/701,698, Jed Stremel, System and Method for Digital File Distribution, filed Feb. 2, 2007.

U.S. Appl. No. 11/713,455, Jed Stremel, Systems and Methods for Automatically Locating Web-Based Social Network Members, filed Feb. 28, 2007.

U.S. Appl. No. 11/701,566, Jed Stremel, System and Method for Automatic Population of a Contact File with Contact Content and Expression Content, filed Feb. 2, 2007.

U.S. Appl. No. 11/503,093, Andrew Bosworth, Systems and Methods for Measuring User Affinity in a Social Network Environment, filed Aug. 11, 2006.

U.S. Appl. No. 11/503,037, Mark Zuckerberg, Systems and Methods for Providing Dynamically Selected Media Content to a User of an Electronic Device in a Social Network Environment, filed Aug. 11, 2006.

U.S. Appl. No. 11/503,242, Mark Zuckerberg, System and Method for Dynamically Providing a News Feed About a User of a Social Network, filed Aug. 11, 2006.

U.S. Appl. No. 11/499,093, Mark Zuckerberg, Systems and Methods for Dynamically Generating Segmented Community Flyers, filed Aug. 2, 2006.

U.S. Appl. No. 11/580,210, Mark Zuckerberg, System and Method for Tagging Digital Media, filed Oct. 11, 2006.

U.S. Appl. No. 11/893,493, Arieh Steinberg, Web-Based Social Network Badges, filed Aug. 15, 2007.

U.S. Appl. No. 11/982,974, Ruchi Sanghvi, Systems and Methods for a Web-Based Social Networking Environment Integrated Within One or More Computing and/or Networking Applications, filed Nov. 5, 2007.

U.S. Appl. No. 11/701,595, Ezra Callahan, System and Method for Determining a Trust Level in a Social Network Environment, filed Feb. 2, 2007.

U.S. Appl. No. 11/726,962, Charlie Cheever, System and Method for Confirming an Association in a Web-Based Social Network, filed Mar. 23, 2007.

U.S. Appl. No. 11/701,744, Andrew Bosworth, System and Method for Curtailing Objectionable Behavior in a Web-Based Social Network, filed Feb. 2, 2007.

U.S. Appl. No. 11/796,184, Jared S. Morgenstern, System and Method for Giving Gifts and Displaying Assets in a Social Network Environment, filed Apr. 27, 2007.

U.S. Appl. No. 11/893,797, Yun-Fang Juan, System and Method for Invitation Targeting in a Web-Based Social Network, filed Aug. 16, 2007.

U.S. Appl. No. 11/893,820, Yun-Fang Juan, Systems and Methods for Keyword Selection in a Web-Based Social Network, filed Aug. 16, 2007.

U.S. Appl. No. 11/899,426, Jared Morgenstern, System and Method for Collectively Giving Gifts in a Social Network Environment, filed Sep. 5, 2007.

U.S. Appl. No. 12/072,003, Arieh Steinberg, Systems and Methods for Implementation of a Structured Query Language Interface in a Distributed Database Environment, filed Feb. 21, 2008.

U.S. Appl. No. 12/077,070, Dave Fetterman, Systems and Methods for Network Authentication, filed Mar. 13, 2008.

U.S. Appl. No. 12/154,504, Adam D'Angelo, Personalized Platform for Accessing Internet Applications, filed May 23, 2008.

U.S. Appl. No. 12/156,091, Mark Zuckerberg, Systems and Methods for Auction-Based Polling, filed May 28, 2008.

U.S. Appl. No. 12/151,734, Jared Morgenstern, Systems and Methods for Classified Advertising in an Authenticated Web-Based Social Network, filed May 7, 2008.

U.S. Appl. No. 12/154,886, Nico Vera, Systems and Methods for Providing Privacy Settings for Applications Associated with a User Profile, filed May 27, 2008.

U.S. Appl. No. 60/965,624, Adam D'Angelo, Systems and Methods for Targeting Advertisements in a Social Network Environment, filed Aug. 20, 2007.

U.S. Appl. No. 11/893,559, Adam D'Angelo, Platform for Providing a Social Context to Software Applications, filed Aug. 15, 2007.

U.S. Appl. No. 60/967,842, Ezra Callahan, Systems and Methods for Dynamically Updating Privacy Settings, filed Sep. 7, 2007.

U.S. Appl. No. 60/966,442, Ezra Callahan, System and Method for Incorporating an Entity or Group other than a Natural Person into a Social Network, filed Aug. 28, 2007.

U.S. Appl. No. 60/965,852, Adam D'Angelo, Systems and Methods for Advertising, filed Aug. 22, 2007.

U.S. Appl. No. 61/005,614, Yishan Wong, Systems and Methods for Community Translations on a Web-Based Social Network, filed Dec. 5, 2007.

U.S. Appl. No. 12/080,808, Peter Deng, Systems and Methods for Calendaring, filed Apr. 2, 2008.

Flores, Fernando et al. "Computer systems and the design of organizational interaction." In ACM Transactions on Information Systems (TOIS), vol. 6, Issue 2, Apr. 1988.

Chipin. ChipIn: The easy way to collect money [online], Dec. 15, 2006 http://web.archive.org/web/20061215090739/www.chipin.com/overview.

Parzek, E. Social Networking to ChipIn to a Good Cause [online]. Business Design Studio, Jun. 29, 2006 http://www.businessdesignstudio.com/resources/blogger/2006/06social-networking-tochipin-to-good.html.

PCT International Search Report and Written Opinion, PCT/US07/17572, Jun. 20, 2008, 11 pages.

Supplementary European Search Report, European Patent Application No. EP 07836589, Dec. 23, 2009, 4 Pages.

First Office Action of China State Intellectual Property Office, Chinese Patent Application No. 200780034021.3, Feb. 12, 2010, 7 pages.

* cited by examiner

FIG. 3 facebook                                    home   search   browse   mobile   invite   help   logout

Welcome Matt!

Search  _edit_

My Profile
My Friends
My Photos
My Groups
My Events
My Messages (2)
My Account
My Privacy ✉ You have 2 new messages.
👤 You have 7 friend requests.

My Status                    _edit_

Matt is zuru zuru
zuru zuru.
Updated last Wednesday

Upcoming Events    see all

Putnam Appreciation B(day)
Today, July 12 at 3:20pm

Birthdays                   see all

Today's Birthdays
Dr Chris Putnam

July 14th Birthdays
Christina Holsberry
Randy Sackfield
Trevor Harkema
Austin Shoemaker

The Next Step         see all

Post your photos on Facebook Photos. Enjoy unlimited uploads!

---

Dana joined the group Who Is Myke Jones?
Dana Constantinov recently joined the group Who Is Myke Jones?. This is for everbody who wants to know. who is Myke Jones?. There are currently 120 people, including 16 of your friends, in this group.

402

Anthony joined the group Pugs? Yes, please!
Anthony Davis recently joined the group Pugs? Yes, please! Sure, it looks like a pig who ran head–first into the side of a barn. But ... see more. There are currently 250 people, including 16 of your friends, in this group.

404

Chris is attending G.I. Hoes Bladder Bust Wednesday
Chris Ricci is planning to attend G.I. Hoes Bladder Bust Wednesday. So far another 114 people are going as well.

Brittany is attending Steven Helmkamp
Brittany Gray is planning to attend Steven Helmkamp. So far another 30 people are going as well.

Chris is attempting Abigail Occiano
Chris Ricci is planning to attend Abigail Occiano. So far another 28 people are going as well.

Starlyn and Tommy are in a relationship
Starlyn Walker and Tommy Babcock are now officially in a relationship See All Recent Stories

GENERATING A FEED OF STORIES PERSONALIZED FOR MEMBERS OF A SOCIAL NETWORK

CROSS-REFERENCE TO RELATED APPLICATIONS

The present application incorporates by reference U.S. Provisional Patent Application Ser. No. 60/750,844 filed on Dec. 14, 2005 for "Systems and Methods for Social Mapping," U.S. Provisional Patent Application Ser. No. 60/753,810 filed on Dec. 23, 2005 for "Systems and Methods for Social Timeline," U.S. patent application Ser. No. 11/493,291 filed on Jul. 25, 2006 for "Systems and Methods for Dynamically Generating a Privacy Summary," U.S. patent application Ser. No. 11/503,093 filed on Aug. 11, 2006, for "Systems and Methods for Measuring User Affinity in a Social Network Environment," U.S. patent application Ser. No. 11/503,037 filed on Aug. 11, 2006, for "Systems and Methods for Providing Dynamically Selected Media Content to a User of an Electronic Device in a Social Network Environment," and U.S. patent application Ser. No. 11/503,242 filed on Aug. 11, 2006, for "System and Method for Dynamically Providing a News Feed About a User of a Social Network."

BACKGROUND OF THE INVENTION

1. Field of the Invention

The present invention relates generally to social networking, and more particularly to systems and methods for generating dynamic relationship-based content personalized for members of a web-based social network.

2. Description of Related Art

As social networking has grown more popular, the information available to each member has become voluminous. Accordingly, members may be inundated with information that does not interest the members. Further, members may find themselves unable to find in a timely and efficient manner the information that does interest them, such as information about their friends and their community. There is therefore a need for systems and methods for generating dynamic relationship-based content personalized for members of a web-based social network.

SUMMARY OF THE INVENTION

Systems and methods for generating dynamic relationship-based content personalized for members of a web-based social network are provided. An exemplary method comprises storing at least one action of one or more members of a web-based social network, accessing relationship data for the one or more members, associating the at least one action with the relationship data to produce consolidated data, identifying one or more elements associated with the consolidated data, and aggregating the consolidated data based on the one or more elements to produce aggregated consolidated data. Further exemplary methods comprise weighting by affinity the aggregated consolidated data to generate dynamic relationship-based content personalized for the members of the web-based social network.

An exemplary system for generating dynamic relationship-based content personalized for members of a web-based social network comprises a database configured for storing at least one action of one or more members of a web-based social network, a database configured with relationship data for the one or more members of the web-based social network, a processing module configured with an association component to associate the at least one action with the relationship data to produce consolidated data, the processing module configured with an identification component to identify one or more elements associated with the consolidated data, and the processing module configured with an aggregation component to aggregate the consolidated data based on the one or more elements to produce aggregated consolidated data. A further exemplary system comprises the processing module configured with an affinity component to weight by affinity the aggregated consolidated data to generate dynamic relationship-based content personalized for the members of the web-based social network.

DETAILED DESCRIPTION

Systems and methods for generating dynamic relationship-based content personalized for members of a web-based social network are provided. At least one action of one or more members of a web-based social network is associated with relationship data for the one or more members to produce consolidated data. One or more elements associated with the consolidated data are identified and used to aggregate the consolidated data. Further exemplary methods comprise weighting by affinity the aggregated consolidated data to generate dynamic relationship-based content personalized for the members of the web-based social network.

Figure 1:
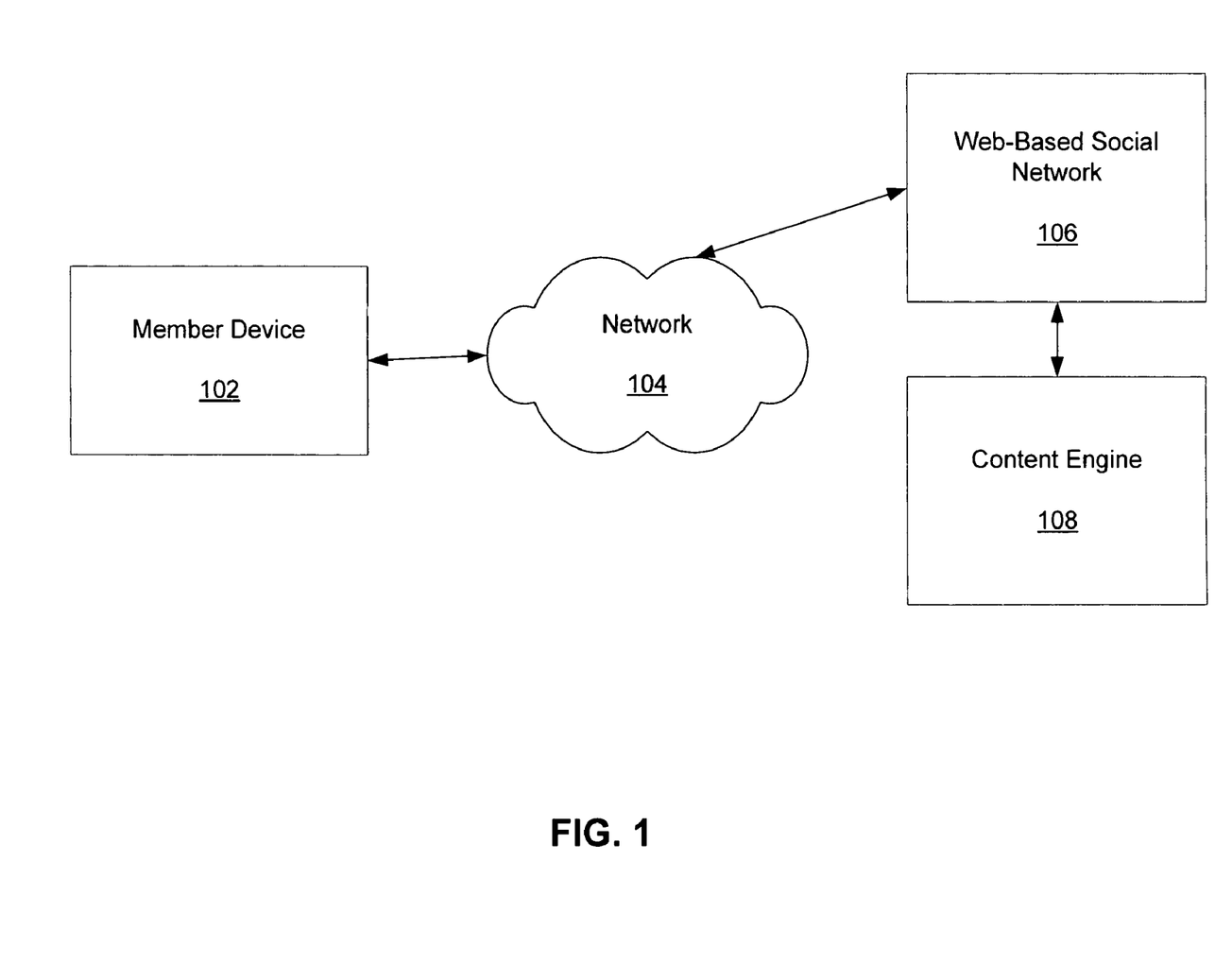
FIG. 1 illustrates an exemplary environment for generating dynamic relationship-based content personalized for members of a web-based social network.

FIG. 1 illustrates an exemplary environment for generating dynamic relationship-based content personalized for members of a web-based social network. One or more members, such as a member at a member device 102, are coupled to a web-based social network 106 via a network 104.

The web-based social network 106 may comprise any entity that provides social networking services, communication services, dating services, and so forth. For example, the web-based social network 106 may host a website that allows one or more members, such as the member at the member device 102, to communicate with one another via the website. In one instance, a first member associated with the member device 102 may communicate with one or more second members associated with one or more second member devices via a social networking website associated with the web-based social network 106. The social networking website offers the member an opportunity to connect or reconnect with the one or more second members that attended, for example, the same university as the member.

According to exemplary embodiments, one or more networks or communities may be provided for each member. For example, the member may have a network comprised of people grouped according to a university attended, a network comprised of people grouped according to the member's geographical location of residence, a network comprised of people grouped according to a common field of work, a network comprised of people grouped according to a particular business, and so forth.

A content engine 108 is coupled to the web-based social network 106. The content engine 108 utilizes action and relationship data about the one or more members, such as the member at the member device 102, to generate dynamic relationship-based content personalized for members of the web-based social network 106. According to some embodiments, the member device 102 may be directly coupled to the content engine 108. According to other embodiments, the content engine 108 comprises a module associated with the web-based social network 106.

Figure 2:
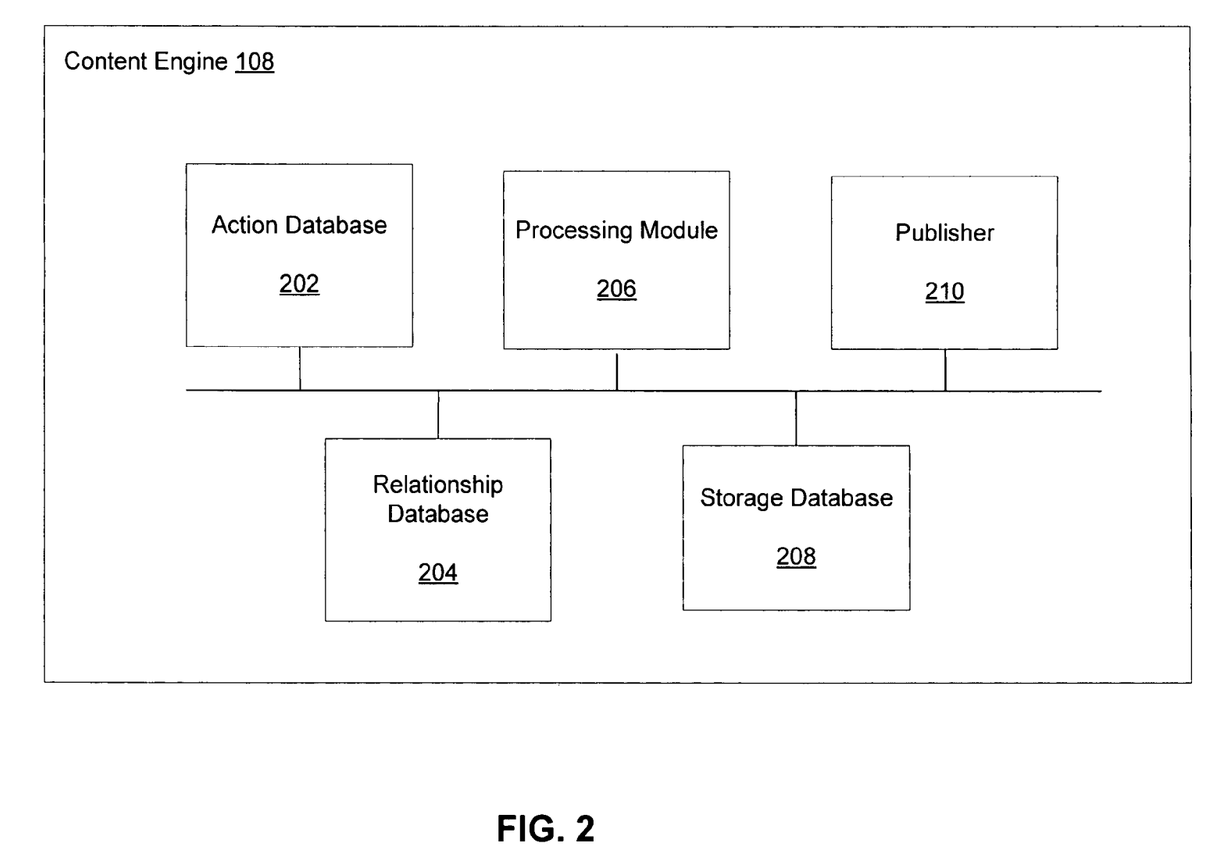
FIG. 2 is a block diagram of an exemplary content engine.

Referring now to FIG. 2, a block diagram of an exemplary content engine is shown. Exemplary content engine 108 comprises an action database 202, relationship database 204, processing module 206, storage database 208, and publisher 210.

An action database 202 may store one or more member actions or activities on the web-based social network 106 (FIG. 1). For example, the action database 202 may store member actions with one or more items of content, such as news stories, other members' profiles, and/or email provided via the web-based social network 106. Any type of member action may be stored in the action database 202.

According to exemplary embodiments, action data may represent a particular member's actions on the web-based social network 106 for a particular period of time, such as the most recent hour, six hours, day, week or month. For example, Member A's action data may represent Member A's actions for the last hour of sending an email to another member, electing to attend a concert with three other members, and adding a photo to Member A's profile.

A relationship database 204 is provided for storing relationship data associated with each of the members, such as the member associated with the member device 102 (FIG. 1). According to exemplary embodiments, relationship database 204 comprises a member profile for each member of the web-based social network 106. When a member joins web-based social network 106, a member profile may be generated for the member. The member can specify relationships with one or more other members via the member profile, or by any other means. The member can assign categories, groups, networks, and so forth to the one or more other members with which the member has a relationship. The relationship, for example, may specify that the member is a friend, friend of a friend, family member, schoolmate, ex-girlfriend, and so forth. Any type of relationship may be specified. Further, the member may group other members according to one or more categories. When the member updates information in the member profile, such as adding additional contacts or friends, the member profile in the relationship database 204 may be updated with the information added.

Figure 3:
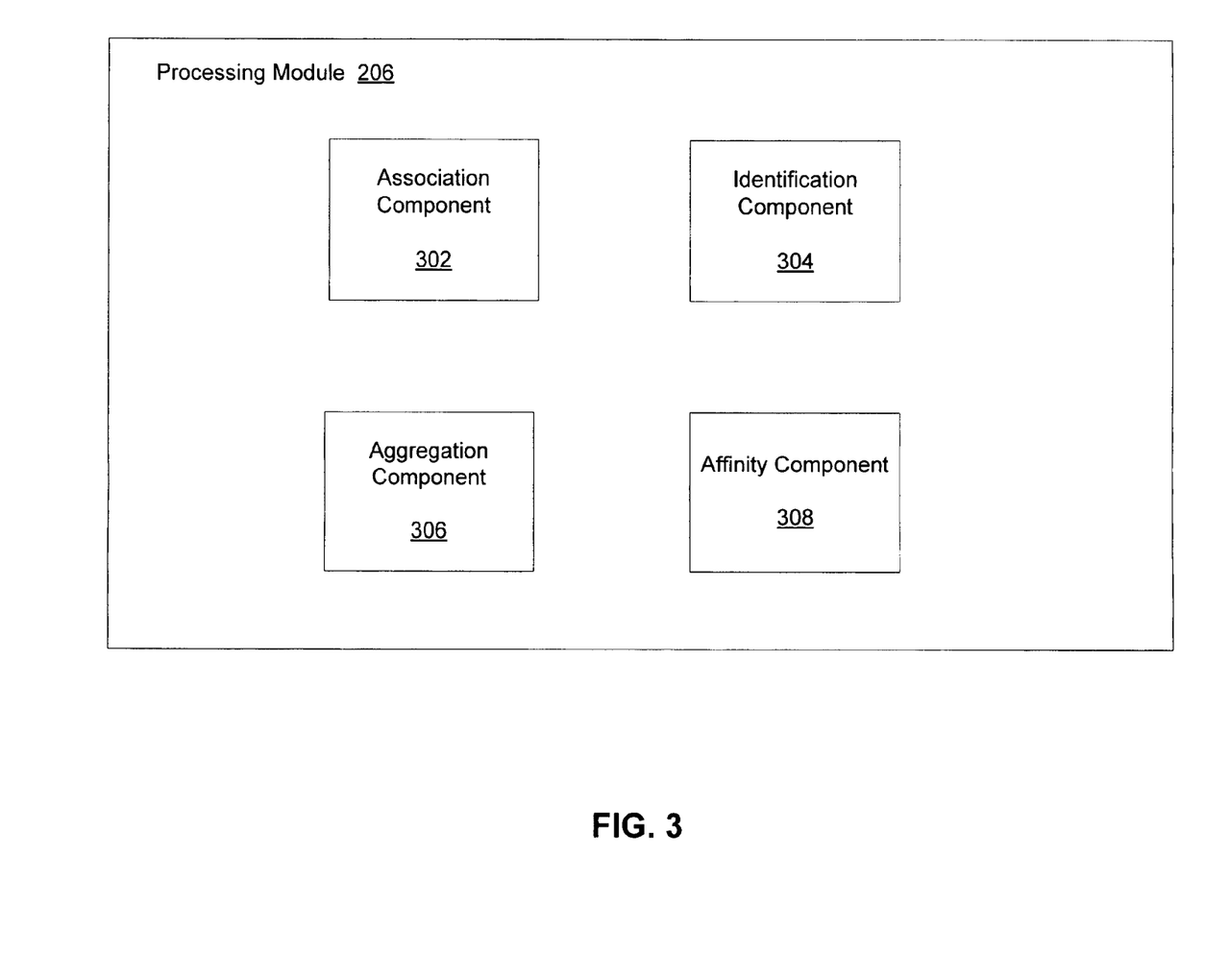
FIG. 3 is a block diagram of an exemplary processing module.

According to some embodiments, processing module 206 is provided for performing several functions as described herein in connection with FIG. 3. Among other things, processing module 206 is responsible for associating member actions with member relationship data to produce consolidated data. Processing module 206 identifies one or more elements associated with the consolidated data and aggregates the consolidated data based on the one or more elements to produce aggregated consolidated data. In a further embodiment, processing module 206 weights by affinity the aggregated consolidated data to generate dynamic relationship-based content personalized for the members of the web-based social network 106. Storage database 208 may be provided for storing the generated dynamic relationship-based content personalized for the members of the web-based social network 106.

Publisher 210 may be provided for publishing the generated dynamic relationship-based content personalized for the members of the web-based social network 106. According to one embodiment, publisher 210 comprises a server configured to send the generated dynamic relationship-based content to a member for whom the content has been personalized. In a further embodiment, publisher 210 is configured to format content in a predetermined arrangement style for presentation to the member of the web-based social network 106.

Although the exemplary content engine 108 is described as being comprised of various components (the action database 202, the relationship database 204, processing module 206, storage database 208, and publisher 210), fewer or more components may comprise the content engine 108 and still fall within the scope of various embodiments.

FIG. 3 is a block diagram of an exemplary processing module. As described in connection with FIG. 2, according to one embodiment, processing module 206 comprises an association component 302, an identification component 304, an aggregation component 306, and an affinity component 308.

Association component 302 is configured to associate one or more member actions with the member's relationship data to produce consolidated data. For example, Member A's profile may include fifteen friends of Member A and another twenty friends of Member A's friends ("friends of friends"). Association component 302 will associate Member A's actions with Member A's friends, friends of friends, and/or other members. For instance, association component 302 might associate Member A's action of joining a group dedicated to the band "Green Day" with Member A's friends who also belong to the same group. In this example, the produced consolidated data might be in the form of "Member A joins Green Day Group, which also includes Member A's friends Pete and Bill."

An identification component 304 may be provided as part of processing module 206 to identify one or more elements associated with the consolidated data. For example, with respect to consolidated data in the form of "Member A joins Green Day Group, which also includes Member A's friends Pete and Bill," identification component 304 might identify the elements of "Green Day." According to some embodiments, identification component 304 may identify any element of an action associated with relationship data (to form consolidated data). For example, identification component 304 may identify an element based on action type, members involved, media or content type, and/or multiple elements thereof. The identified elements are used to aggregate consolidated data, as described herein.

According to some embodiments, aggregation component 306 is provided to aggregate the consolidated data based on the one or more elements to produce aggregated consolidated data. For example, aggregation component 306 might utilize the elements of "Green Day" to aggregate the consolidated data of "Member A joins Green Day Group, which also includes Member A's friends Pete and Bill," with other consolidated data sharing the same elements of "Green Day." In this example, aggregation by aggregation component 306 might result in aggregated consolidated data in the form of "Member A and fifty other members of Member A's community join the Green Day Group." Aggregation component 306 may utilize other parameters or criteria for aggregation and remain within the scope of embodiments claimed herein.

According to some embodiments, affinity component 308 is provided to weight by affinity the aggregated consolidated data to generate dynamic relationship-based content personalized for members of web-based social network 106. Based on one or more member activities and associated relationships, an affinity for past, present, or future content may be determined by the affinity component 308. Any type of variable may be considered when determining an affinity for the affinity component 308 to weight the aggregated consolidated data. In a further embodiment, affinity component 308 may be utilized to assign an order to the content presented to the member. For example, a story about Member B breaking up with Member C may be rated lower than a story about Member A's brother having a baby, and accordingly, the story about Member B breaking up with Member C may appear below the story about Member A's brother having a baby.

Figure 4:
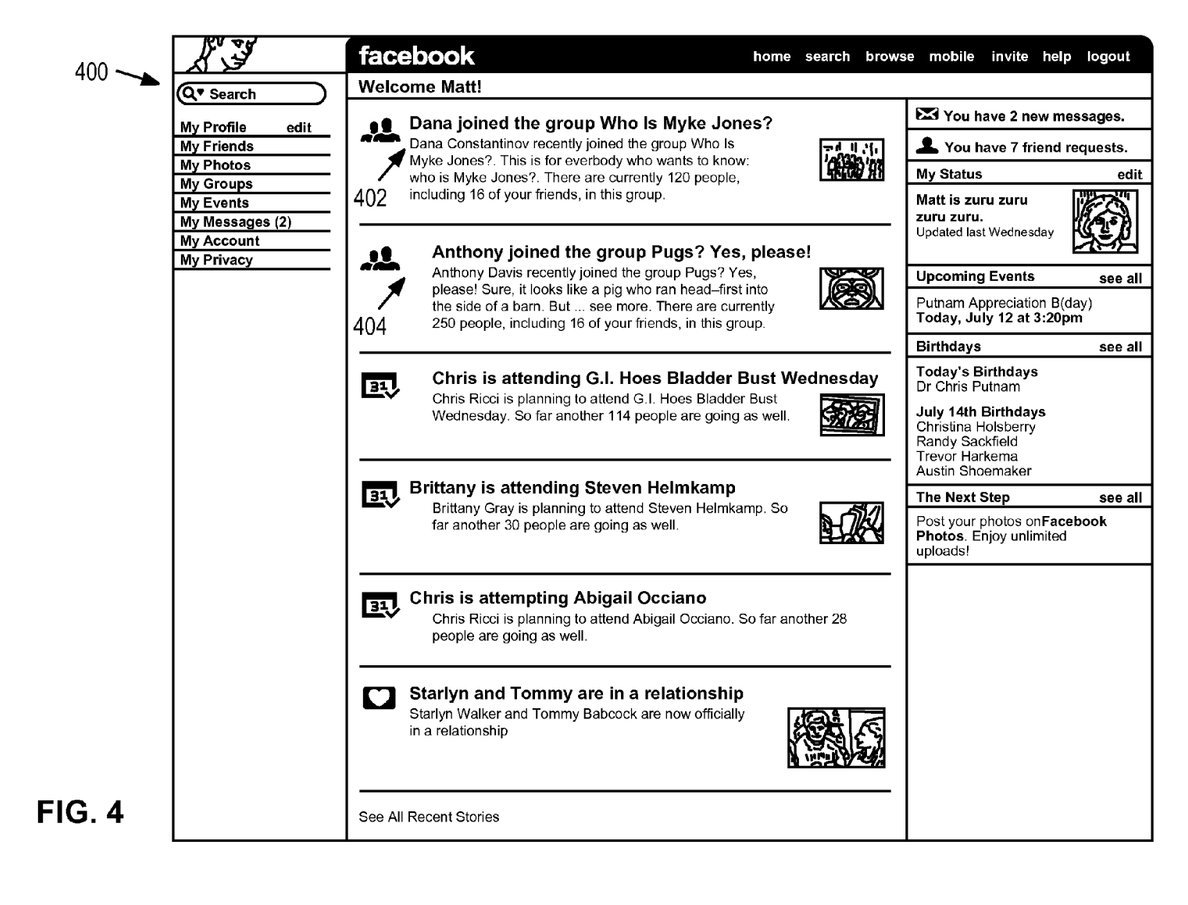
FIG. 4 is an exemplary screen shot of items of generated dynamic relationship-based content personalized for a member of a web-based social network.

FIG. 4 is an exemplary screen shot of items of generated dynamic relationship-based content personalized for a member of a web-based social network. The exemplary screen shot 400 represents the display page associated with a particular member, such as the member at member device 102. Various stories, content, and so forth may be displayed via the display page. In the exemplary screen shot shown in FIG. 4, several stories and/or story headlines are displayed.

A first story 402, entitled "Dana joined the group Who is Myke Jones?" is rated highest according to affinity. An affinity may have been assigned to each story appearing on the display page, based on the member's interaction with other content and the member's relationships associated with the member's interaction with the other content. The stories are then displayed in an order according to the affinity. For example, the first story 402 is assigned the highest order based on the affinity determined for the member for content and/or other members included in the first story 402, while a second story 404, entitled "Anthony joined the group Pugs? Yes, please!", is assigned the second highest order based on the affinity determined for the member with respect to the content and/or the other members included in the second story 404, and so forth.

Although the affinity is determined based on the one or more member activities within the web-based social network 106, according to some embodiments, member activity outside of the web-based social network 106 may also be considered in determining affinity for content and/or other members.

Figure 5:
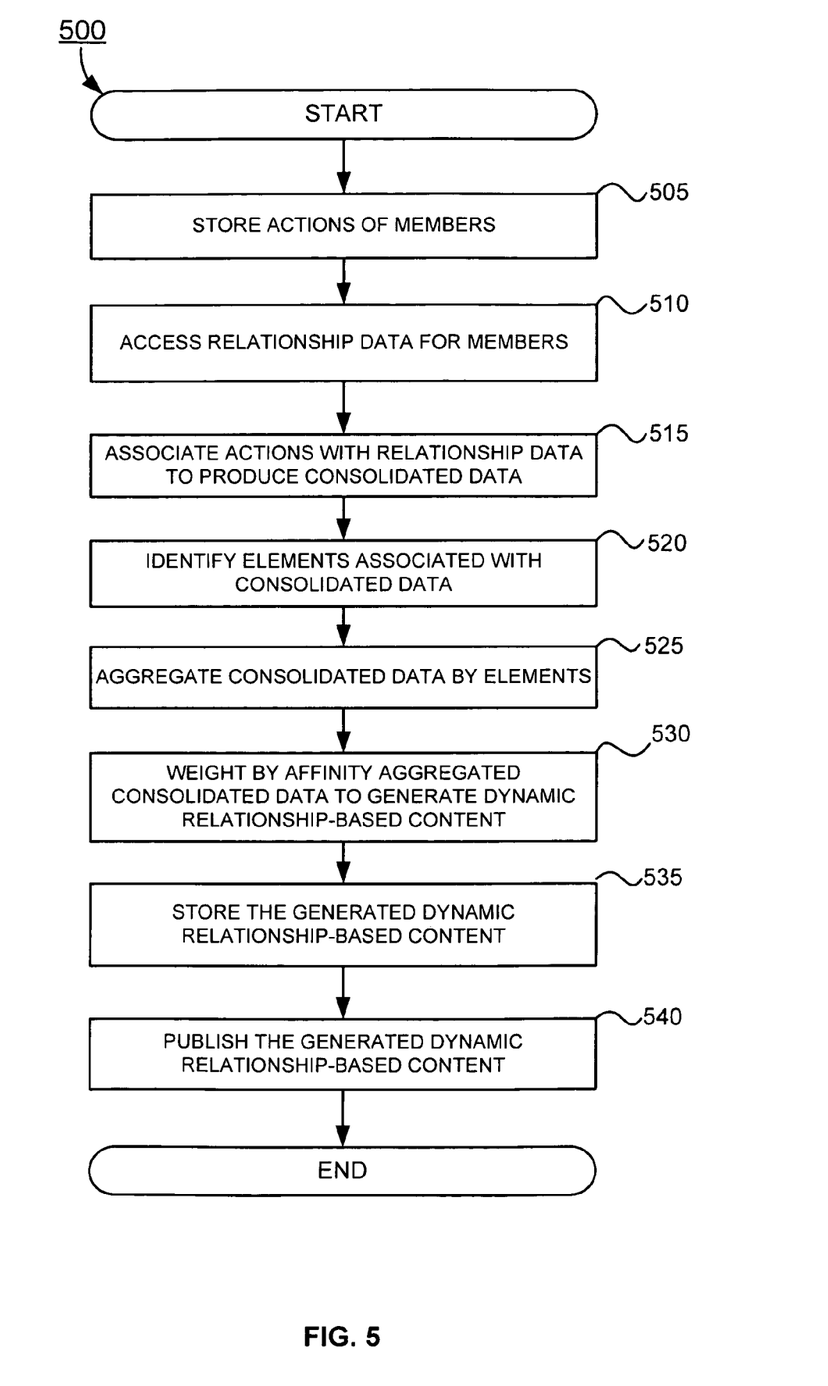
FIG. 5 is a flow diagram of an exemplary process for generating dynamic relationship-based content personalized for members of a web-based social network.

Referring now to FIG. 5, a flow diagram of an exemplary process for generating dynamic relationship-based content personalized for members of a web-based social network is shown.

At step 505, at least one action of one or more members of web-based social network 106 (FIG. 1) is stored. According to one embodiment, member action data may represent a particular member's actions on the web-based social network 106 for a particular period of time.

At step 510, relationship data for the one or more members of the web-based social network 106 is accessed. In one embodiment, a relationship database 204 (FIG. 2) stores data configured in member profiles, including friends and/or friends of friends of members.

At step 515, at least one action (step 505) is associated with the relationship data (step 510) to produce consolidated data. In one embodiment, association component 302 associates a member's actions with the member's friends and/or the member's friends of friends that might have also been involved with the same actions.

At step 520, one or more elements associated with the consolidated data are identified. In one embodiment, an identification component 304 identifies one or more symbols, sounds and/or images associated with consolidated data.

At step 525, the consolidated data is aggregated based on the one or more elements to produce aggregated consolidated data.

At step 530, the aggregated consolidated data is weighted by an affinity to generate dynamic relationship-based content personalized for the members of the web-based social network 106. According to some embodiments, the content may be generated and/or ordered according to a prediction of future member activities.

At step 535, the generated dynamic relationship-based content personalized for the members of the web-based social network 106 is stored.

At step 540, the stored generated dynamic relationship-based content is published for the members of the web-based social network 106. In one embodiment, a server is configured to send the content to a member for whom the content has been personalized.

While various embodiments have been described above, it should be understood that they have been presented by way of example only, and not limitation. For example, any of the elements associated with the content engine may employ any of the desired functionality set forth hereinabove. Thus, the breadth and scope of a preferred embodiment should not be limited by any of the above-described exemplary embodiments.

Embodiments of this invention may also include a computer readable medium having embodied thereon a program, the program being executable by a processor for performing a method, as described herein, for generating dynamic relationship-based content personalized for members of a web-based social network.

What is claimed is:

1. A method for generating a personalized story for a viewing user of a social network, comprising:

storing actions performed by one or more users of a social network;

accessing relationship data for the one or more users, the relationship data specifying relationships between users in the social network;

associating at least one action with at least one user to produce consolidated data, wherein the consolidated data for each of a plurality of actions identifies at least an action and a user of the social network who performed the action;

identifying one or more elements associated with the consolidated data;

aggregating consolidated data having one or more common elements to produce aggregated consolidated data, wherein the aggregated consolidated data identifies at least an action associated with a common element, a user of the social network who performed the action, and one or more other users of the social network who also performed an action associated with the common element;

generating a story personalized for the viewing user, wherein the story comprises at least a description of the action, the user who performed the action, and the one or more other users who also performed an action associated with the common element; and sending the story for display to the viewing user.

2. The method of claim 1, further comprising storing the generated story personalized for the users of the social network.

3. The method of claim 1, wherein the relationship data comprises friends of the one or more users of the social network.

4. The method of claim 3, wherein the relationship data comprises friends of the friends of the one or more users of the social network.

5. The method of claim 1, wherein the at least one action is a change to a user profile.

6. The method of claim 1, wherein generating the story for a user comprises weighting the aggregated consolidated data by the user's affinity thereto and selecting the aggregated consolidated data based at least in part on the weighting.

7. The method of claim 1, wherein the story comprises at least one of an image, a sound, or a selectable link.

8. A system for generating a personalized story for a viewing user of a social network, the system comprising:
   an action database storing actions performed by one or more users of a social network;
   a relationship database storing relationship data for the one or more users of the social network, the relationship data specifying relationships between users in the social network;
   a processor;
   a processing module coupled to the action database and the relationship database and operatively coupled to the processor for performing instructions in response thereto, comprising:
      an association component to associate actions in the action database with the users who performed the action to produce consolidated data, wherein the consolidated data for each of a plurality of actions identifies at least an action and a user of the social network who performed the action;
      an identification component to identify one or more elements associated with the consolidated data;
      an aggregation component to aggregate consolidated data having one or more common elements to produce aggregated consolidated data, wherein the aggregated consolidated data identifies at least an action associated with a common element, a user of the social network who performed the action, and one or more other users of the social network who also performed an action associated with the common element;
      a component to generate a story personalized for the viewing user, wherein the story comprises at least a description of the action, the user who performed the action, and the one or more other users who also performed an action associated with the common element; and
   a server to send the story for display to the viewing user.

9. The system of claim 8, further comprising a database storing the generated story personalized for the users of the social network.

10. The system of claim 8, wherein the relationship data comprises friends of the one or more users of the social network.

11. The system of claim 10, wherein the relationship data comprises friends of the friends of the one or more users of the social network.

12. The system of claim 8, further comprising an affinity component to weight the aggregated consolidated data by the user's affinity thereto and select the aggregated consolidated data based at least in part on the weighting.

13. The system of claim 8, wherein the story comprises at least one of an image, a sound, or a selectable link.

14. A computer readable medium having embodied thereon a program, the program being executable by a processor for performing a method for generating a personalized story for a viewing user of a social network, the method comprising:
   storing actions performed by one or more users of a social network;
   accessing relationship data for the one or more users, the relationship data specifying relationships between users in the social network;
   associating at least one action with at least one user to produce consolidated data, wherein the consolidated data for each of a plurality of actions identifies at least an action and a user of the social network who performed the action;
   identifying one or more elements associated with the consolidated data;
   aggregating consolidated data having one or more common elements to produce aggregated consolidated data, wherein the aggregated consolidated data identifies at least an action associated with a common element, a user of the social network who performed the action, and one or more other users of the social network who also performed an action associated with the common element;
   generating a story personalized for the viewing user, wherein the story comprises at least a description of the action, the user who performed the action, and the one or more other users who also performed an action associated with the common element; and
   sending the story for display to the viewing user.

15. The computer readable medium of claim 14, further comprising storing the generated story personalized for the users of the social network.

16. The computer readable medium of claim 14, wherein the relationship data comprises friends of the one or more users of the social network.

17. The computer readable medium of claim 14, wherein the relationship data comprises friends of the friends of the one or more users of the social network.

18. The computer readable medium of claim 14, wherein generating the story for a user comprises weighting the aggregated consolidated data by the user's affinity thereto and selecting the aggregated consolidated data based at least in part on the weighting.

19. The computer readable medium of claim 14, wherein the story comprises at least one of an image, a sound, or a selectable link.

* * * * *